US005382298A

United States Patent [19]

Bondurant

[11] Patent Number: 5,382,298

[45] Date of Patent: * Jan. 17, 1995

[54] CLEANSING AND DESENSITIZING SOLUTIONS AND METHODS FOR USE IN OFFSET PRINTING

[76] Inventor: Louis E. Bondurant, P.O. Box 2074, Middleburg, Va. 22117

[ * ] Notice: The portion of the term of this patent subsequent to Apr. 20, 2010 has been disclaimed.

[21] Appl. No.: 15,608

[22] Filed: Feb. 9, 1993

Related U.S. Application Data

[63] Continuation-in-part of Ser. No. 847,328, Mar. 6, 1992, Pat. No. 5,203,926.

[51] Int. Cl.[6] .................... B41F 35/04; C09D 5/20; C11D 7/08; C11D 7/50

[52] U.S. Cl. .................... 134/42; 101/424; 101/451; 101/483; 101/492; 134/32; 134/34; 252/135; 252/136; 252/139; 252/140; 252/143; 252/144; 252/164; 252/173; 252/174.19; 252/174.25; 252/524; 252/525; 252/DIG. 14

[58] Field of Search .............. 252/135, 136, 139, 140, 252/143, 144, 164, 173, 174.25, DIG. 14, 524, 525, 174.19; 134/32, 34, 42; 106/2; 101/424, 451, 483, 492

[56] References Cited

U.S. PATENT DOCUMENTS

| | | | |
|---|---|---|---|
| 3,398,002 | 8/1968 | Bondurant | 106/2 |
| 3,627,685 | 12/1971 | Lam | 252/100 |
| 3,664,064 | 5/1972 | Scheuer | 51/402 |
| 4,028,281 | 6/1977 | Millard | 252/527 |
| 4,374,036 | 2/1983 | Canale | 252/135 |
| 4,504,406 | 3/1985 | Dhillon | 252/143 |
| 4,507,155 | 3/1985 | Cheek | 134/6 |
| 4,548,645 | 10/1985 | Thiebaut | 106/2 |
| 4,769,072 | 9/1988 | Bondurant | 106/2 |
| 4,829,897 | 5/1989 | Wyman | 134/40 |
| 4,880,555 | 11/1989 | Walls | 252/143 |

*Primary Examiner*—Dennis Albrecht
*Attorney, Agent, or Firm*—Raymond N. Baker

[57] ABSTRACT

Press component cleansing and desensitizing treatment solutions contain (A) about two percent to about thirty percent by weight of a liquid humectant, (B) about one percent to about twenty-five percent by weight of a buffer which can include a trace amount of phosphoric, lactic or citric acid to stabilize pH, (C) about two point five percent to about twenty-five percent by weight of a liquid constituent selected from the group consisting of ethylene glycol monobutyl ether and propylene glycol n-butyl ether, and (D) about point two percent to about seven point five percent by weight of a non-soluble pulverant solid with a particle size of about three to about five micrometers; and, in such solutions, about one to about twenty-five percent by weight of an amine can be substituted for an alcohol, or about point two percent to about five percent by weight mineral spirits can be substituted in place of alcohols and/or amines, with the balance water; further, about point two percent to about five percent by weight gum arabic can be added for extending desensitizing effectiveness. Such treatment solutions help to maintain image clarity, enable planned interruption of press runs and restart without requiring re-registry procedures, and, also, avoid significant disturbance to selections of fountain solutions and printing inks made for compatibility with equipment or materials during a press run.

10 Claims, No Drawings

CLEANSING AND DESENSITIZING SOLUTIONS AND METHODS FOR USE IN OFFSET PRINTING

This Application is a continuation-in-part of Application Ser. No. 07/847,328, "Cleanser and Desensitizer", filed Mar. 6, 1992, now U.S. Pat. No. 5,203,926, issued Apr. 20, 1993.

This invention relates to cleansing and treatment of planographic printing press components which help to maintain desired printing quality. More particularly, this invention is concerned with new cleansing and desensitizing treatment solutions, with use of those solutions to decrease costs during planographic printing press runs, and with providing treatment solutions which enable use of existing press equipment and materials while taking into consideration factors which could be subject to increasing environmental regulation.

Planographic printing involves continuous coaction of press roll means with a roll-mounted printing plate during printing operations. Metal surfaces of the fountain solution (moisturizing) system transfer fountain solution to water-receptive non-print areas of the printing plate; an ink roller transfers ink to water-repellent ink-receptive print areas of the printing plate; and the printing plate transfers ink and moisture to the blanket cylinder for offset printing operations.

It should be noted that the terms "fountain solution system" and "water system" are often used synonymously; for example, metal surfaces transfer "fountain solution" or "water" for proper "moisturizing" of the water-receptive non-print areas of the printing plate and, subsequently, the blanket cylinder. Such proper transfer of "moisture" is accomplished by the fountain solution system. It should also be recognized that developments in the fountain solution field help to avoid or solve problems associated with those moisturizing functions, and with compatibility aspects often related to equipment and materials, which help to make printing more efficient and improve printing quality.

The present teachings are concerned with cleansing and desensitizing functions which effect and help to minimize transfer problems associated with (1) the ink system, (2) the moisturizer system, and (3) the plate to blanket system; more specifically, the invention is concerned with providing methods and means for more efficient and effective transfer operations which can be carried out without requiring dismantling of the press. Other objectives are to avoid interfering with the compatibility factors preselectively established for a press run; and, also, to diminish environmental concerns with handling, storage and use of chemical solutions for offset printing operations.

The operational steps of moistening the printing plate non-image areas, applying printing ink to the image areas, and transferring the image and moisture to the blanket roll for offset printing are repeated rapidly during printing operations. Press runs can be required to continue for extended periods during which the print areas of the printing plate surface can lose sharpness or clarity and printing quality can deteriorate prematurely; that is, before the desired number of prints have been made. Press runs may also need to be interrupted for scheduled reasons such as the end of the work day. In accordance with present teachings, the printing plate and transfer portions of the fountain solution system can be treated during an interruption in printing operations so as to enable such components to continue in use without replacement, and/or to enable efficient start-up usage after a planned interruption period in printing operations without requiring dismantling of the press before, during or after the interruption period.

One aspect of the invention is concerned with extending the useful life of printing plates. Another is concerned with desensitizing both water-receptive and water transfer surfaces involved in the moistening function (carried out by the fountain solution system) because those surfaces are exposed to printing ink during planographic printing operations. In its more specific aspects, the invention is concerned with enabling the cleansing and desensitizing treatment functions, as taught herein, to be carried out (a) effectively and efficiently without dismantling the press, (b) without disturbing the compatibility of equipment or materials as selected for a press run, and (c) so as to enable continued use of certain equipment and materials while diminishing the effect of environmental concerns on print shop decisions in setting up and carrying out press runs.

In brief, the invention provides for effective and efficient cleansing and desensitizing treatment of press components carried out in a manner providing for more economically and environmentally sound planographic offset printing.

Periodic cleansing of printing plate and fountain solution components will help to continue the desired distinction between image and non-image portions of the printing plate. And, desired printing quality can be sustained for longer periods by inhibiting ink feedback to water receptive surfaces of the plate and water transfer surfaces of the fountain solution system. That is, the capability of the water receptive surfaces of the fountain solution moisturizing system to remain free of ink is increased by desensitizing the cleansed surfaces which are exposed to ink during printing operations. Treatment of both the printing plate and metal surfaces of water transfer roll means sharpens the image and helps to sustain printing quality.

Also, the desensitizing function enables more efficient termination and start-up of printing operations when quality may not be the main factor in interrupting printing operations; for example, upon termination at the end of a work day, and start-up on a following work day. Further, such treatment of the invention can help to diminish the opportunities for corrosion and oxidation of metal surfaces of the water (fountain solution) system which not only helps to extend a press run but also helps to extend the life of such metal surfaces.

Examples of fountain solutions for moistening water-receptive non-print areas of the printing plate are described in U.S. Pat. No. 3,398,002, U.S. Pat. No. 4,769,072, and copending application Ser. No. 07/846,567 now U.S. Pat. No. 5,268,025 issued Dec. 7, 1993, (which are incorporated herein by reference). As noted earlier, the printing ink and fountain solution systems are continuously in contact with the printing plate during printing operations of a press run; and present teachings enable the described functions to be carried out without significantly disturbing the compatibility of selections made for the press run which can, for example, include pH factors.

A treatment solution of the invention is formulated to provide an aqueous solution in which buffer means, such as a monobasic alkali metal phosphate with a possible trace amount of acid, are used to stabilize pH in an acceptable range. Also, provision is made to permit diminishing or eliminating isopropyl or other alcohols which have a relatively low flash point (from about 10° F. to about 80° F.) by selectively substituting higher flash point constituents such as an amine (for example, N-methyl pyrrolidone Or, a small percentage of a solvent or softener, such as mineral spirits, can be used for dried ink build-up by maintaining a desired percentage of an emulsifier and coupling agent as described below.

An important part of the present teachings is to prevent ink or gum contaminants as removed during cleansing from possible redeposition on the water-receptive or water-transfer surfaces. To avoid such redeposition, the invention teaches use of a constituent which prevents emulsification of the ink in the cleansing and desensitizing solution. Such constituent also carries out a coupling function which facilitates miscibility of the treatment solution constituents as well as miscibility and dilution of contaminants picked up during cleansing.

Further, a liquid humectant constituent is preferably selected from the group consisting of glycerin and propylene glycol in a manner so as to diminish the amount of, or the need for, ethylene glycol. Selections of treatment solution constituents, as taught herein, are to help anticipate concerns with vapors, or the characteristics of vapors, which are likely to become more prominent in offset printing operations.

The treatment solution of the invention for cleansing press components and desensitizing water-transfer and water-receptive surfaces used in planographic offset printing comprises: (A) about two percent to about thirty percent by weight of a liquid humectant; (B) about one percent to about twenty-five percent by weight of a buffer which can include a trace amount of phosphoric, lactic or citric acid to stabilize pH; (C) about two point five percent to about twenty-five percent by weight of an emulsifying and coupling constituent selected from the group consisting of ethylene glycol monobutyl ether, and propylene glycol n butyl ether; (D) about point two percent to about seven point five percent of non-soluble pulverant solid anhydrous aluminum silicate including a kaolin-based material such as Kaopolite TM, or other similar self-abrading, cleansing and polishing materials. In addition, the use of alcohol can be decreased or eliminated by use of from about one to about twenty-five percent by weight of an amine; or, both the alcohol and the amines can be eliminated through use of about point two to about five percent by weight mineral spirits. And, for extending the time of desensitizing effectiveness, about point two percent to about five percent gum arabic can be added, with the balance water. The latter refers to deionized or distilled water, or water sufficiently free of electrolytes to be acceptable. While such water does not contain free acid, it can have a pH of about 5.7 and the water constituent comprises a significant part by weight (about thirty-five percent to about ninety percent by weight) of the treatment solution.

The "buffer" can be selected from the group consisting of mono alkali metal phosphate, monopotassium citrate, and a trace amount of an acid, preferably phosphoric acid, to stabilize the treatment solution pH at a desired level without free acid of any significance for handling purposes.

Enabling decreasing or eliminating alcohols while maintaining desired cleanser/solvent characteristics is a major objective. Copending application cleansing solutions, which are not considered to be part of the prior art, can include about two to about twenty-five percent by weight isopropyl alcohol, ethyl alcohol or n-propyl alcohol. Present teachings enable substitution of equivalent amounts of an amine such as N-methyl pyrrolidone. As a result, a decreased amount of an alcohol of interest for the type of equipment or material (ink) of the press run can be maintained. Further, eliminating the alcohol as well as an amine constituent can take place, as taught herein, by adding mineral spirits and maintaining a desired percentage of the emulsifying and coupling constituent.

In brief, alcohol percentage can be decreased significantly by substitution of an equal amount by weight of an amine, as designated herein; and both can be substantially eliminated by adding up to about five percent by weight mineral spirits while maintaining a desired percentage of an emulsifying and coupling agent.

Constituents include:

| Constituent | By Weight |
|---|---|
| (A) buffer | about 1% to about 25% |
| (B) liquid humectant | about 2% about 30% |
| (C) emulsifying and coupling agent | about 2.5% to about 25% |
| (D) non-soluble pulverant solid | about .2% to about 7.5% |
| (E) (1) cleanser, involving decreasing or eliminating alcohol by use of an amine; or | about 1% to about 25% |
| (2) mineral spirits while maintaining a desired percent of emulsifying and coupling agent. | about .2% to about 5% |
| (F) liquid desensitizer | about .2% to about 5%, and |
| (G) the balance water. | |

The following embodiments of treatment solutions of the invention set forth constituents in terms of percentages by weight:

EXAMPLE 1

| (eliminating alcohols or amines) | |
|---|---|
| buffer | about 1% to about 25% |
| liquid humectant | about 2% to about 30% |
| emulsifying and coupling agent | above about 8% |
| non-soluble pulverant solids | about .2% to about 7.5% |
| mineral spirits | about .2% to about 5% |
| desensitizing liquid | about .2% to about 5%, and |
| the balance water. | |

EXAMPLE 2

| (eliminating alcohol) | |
|---|---|
| buffer | about 1% to about 10% |
| N-methyl pyrrolidone | about 10% to about 25% |
| liquid humectant including ethylene glycol, glycerin or propylene glycol | about 10% to about 25% |

-continued

| (eliminating alcohol) | |
|---|---|
| ethylene glycol monobutyl ether | above 3% |
| non-soluble pulverant solids | about .2% to about 7.5% |
| gum arabic | about .2% to about 1%, and |
| the balance water. | |

EXAMPLE 3

| (eliminating alcohols, amines and ethylene glycol) | |
|---|---|
| buffer | about 1% to about 25% |
| glycerin or propylene glycol | about 10% to about 25% |
| emulsifying and coupling agent | about 10% |
| non-soluble pulverant solids | about .2% to 7.5% |
| mineral spirits | about .2% to about 5% |
| gum arabic | about .2% to about 5%, and |
| the balance water. | |

EXAMPLE 4

| (eliminating alcohols, amines and ethylene glycol) | |
|---|---|
| selections from monopotassium phosphate, monosodium phosphate, monoammonium phosphate or monopotassium citrate | about 1% to about 25% |
| phosphoric, lactic or citric acid | about .2% to about .7% |
| glycerin or propylene glycol | about 2% to about 10% |
| ethylene glycol monobutyl ether or propylene glycol n-butyl ether | abut 10% to about 25% |
| non-soluble pulverant solids from aluminum, sodium or potassium silicate | about .2% to about 7.5% |
| dried ink solvent or softener, such as mineral spirits | about .2% to about 5% |
| desensitizing liquid | about .2% to about 5%, and |
| the balance water. | |

EXAMPLE 5

| (decreased alcohols) | |
|---|---|
| buffer | about 10% |
| amines and/or alcohols | about 7% |
| selection from glycerin, propylene glycol and ethylene glycol | about 2% to about 10% |
| emulsifier and coupling agent | above 3% |
| non-soluble pulverant solids | about .2% to 7.5% |
| desensitizing liquid | about 3%, and |
| the balance water. | |

The treatment solution is formulated as an aqueous solution having base characteristics (pH in the concentrate stage at about 3.5 to about 4.5) utilizing one or more buffers as enumerated, including a possible trace amount of pH stabilizing acid, such as phosphoric acid.

Any requirement of isopropyl or similar alcohols for cleanser/solvent characteristics can be substantially eliminated or decreased so that use of particular equipment or compatible types of materials (such as inks) which may require some alcohol is not in any way disrupted by the cleansing and desensitizing solution. The treatment solution can include an amine such as N-methyl pyrrolidone to replace all or a major portion by weight of the alcohol. The alcohols and amines both can be substantially eliminated or significantly decreased while substituting a constituent to help soften dried ink build-up so as to augment removal by the non-soluble pulverant solid. Use of an emulsifier and coupling agent, such as ethylene monobutyl ether, should be maintained and the percentage by weight can be advantageously increased. For example, isopropyl alcohol and N-methyl pyrrolidone can be eliminated from the treatment solution by adding small percentages of a solvent/softener such as mineral spirits for dried ink, and utilizing an emulsifying and coupling agent above about eight percent.

It is preferable to exclude ethylene glycol as the selected liquid humectant; in particular, if a significant percentage of an alcohol, for example, above about seven-and-a-half percent, is part of the treatment solution.

The non-soluble pulverant solids comprise a particle size to augment cleansing of adherent solidified contaminants. The pulverant size used in jeweler's rouge, or a "fine" to "medium" grit size (as designated for professional dental use), is suitable. The solid pulverant should preferably be self-abrasive; that is, tending to decrease its own particle size rather than abrade the finish surfaces being cleansed. In other words, the solid pulverant is selected to help remove ink or gum contaminants from the finish surfaces of interest without damaging those surfaces. Aluminum, sodium or potassium silicate in a finely powdered pumice form have self-abrading characteristics; about three to about five micrometers (μm) would be an acceptable particle size range.

One purpose of the gum arabic is to augment and to extend, time-wise, the desensitizing of water-receptive plate surfaces and water-transfer metal surfaces of the fountain system by depositing a thin desensitizing film. A solution preferred for treatment of printing plates would use about point two percent to about two point five percent gum arabic; a treatment solution directed more particularly to desensitizing water-transfer metal surfaces would preferably use about five percent by weight gum arabic. A separate food dye, which does not significantly alter desired characteristics, can be used for separate color identification of the latter-described preferred embodiments for certain components.

The first stage for cleansing and/or desensitizing is selection of a treatment solution which is not likely to be detrimental to the compatible selections made for the press run, for example, the ink and fountain solution. Also, a preferable treatment solution can be chosen to maintain a desensitized status for a prescribed period, for example, overnight or over a weekend, so as to enable start-up without significant loss of time or materials. For example, the treated printing plate can remain in the press, avoiding a requirement to carry out proper registering before start-up.

The physical steps of cleansing and desensitizing the planographic printing plate and/or the named press components after selections of the desired treatment solution can be carried out so that interruption of operations can be short before continuing operations. Or, interruptions for more extended periods can be provided for, as desired. Of primary importance in either situation is the capability of carrying out cleansing and/or desensitizing without dismantling the press in any manner which would require re-registry. The press components can be moved manually, in unison, while wiping portions of the printing plate and the metal surfaces of the fountain solution as they approach contact.

For purposes of carrying out the physical steps of cleansing and desensitizing press components, a pad means approved for use in the printing industry is wetted with cleansing and desensitizing solution. Initially, the printing plate will be lightly wiped with the wetted pad; as metal surface portions of the press fountain solution system approach contact or exposure to the printing plate, they are also wiped clean. Cleanliness is important to all transfer aspects of the rapidly repetitious contacts made during printing operations. If cleansing as described is carried out frequently, the printing plate need only be wiped lightly while the metal surfaces of the fountain solution transfer system can be wiped more thoroughly.

After such wiping, the cleansing and desensitizing solution need not be removed completely from treated surfaces before resuming the press run, because (1) of the preliminary selection steps of the cleansing and desensitizing solution so as not to upset the compatibility factors of the press run ink; (2) the treatment solution contains the emulsifying and coupling constituent, as previously described, which prevents the removed ink particles from redepositing; and (3) a remaining desensitizing film on water receptive and transfer surfaces is a desirable feature of the invention.

Thus, the solution characteristics facilitate simplified steps which can be carried out promptly for cleansing and desensitizing during the short down-times of the press in situations where printing is to be continued promptly; and/or preserving the press component surfaces for resumption of operations where interruption is intended to extend over longer periods, while enabling start-up without dismantling or re-registry restart procedures. If printing operations are interrupted overnight or over a weekend, the printing plate can be wiped with diluted fountain solution before start-up.

It is to be understood that variations of, or modifications to, the above-described embodiments can be discerned by those skilled in the art in light of the above teachings. Therefore, in determining the scope of the invention, reference shall be had to the following claims.

We claim:

1. Press component cleansing and desensitizing treatment solution for use, without requiring dismantling of a press, during an interruption of offset printing operations, comprising:

solution buffering means including about 2% to about 25% by weight of a buffer selected from the group consisting of monopotassium phosphate, monoammonium phosphate, monosodium phosphate and monopotassium citrate, a trace amount of about 0.2% to about 0.7% by weight of an acid, selected from the group consisting of phosphoric acid, lactic acid, and citric acid, and combinations thereof;

about 2% to about 25% by weight of a liquid humectant;

about 0.2% to about 5% mineral spirits;

about 2% to about 25% of a liquid constituent selected from the group consisting of ethylene glycol monobutyl ether, propylene glycol n-butyl ether, and combinations thereof;

about 0.2% to about 7.5% by weight of a non-soluble solid pulverant anhydrous aluminum silicate of preselected particle size selected within the range of about three to about five micrometers, for abrading and facilitating removal of surface contaminants on such press components, and the balance water selected from the group consisting of distilled water, deionized water, high-purity low-electrolyte water, and combinations thereof.

2. Press component cleansing and desensitizing treatment solution for use, without requiring dismantling of a press, during an interruption of offset printing operations, comprising:

solution buffering means including about 2% to about 25% by weight of a buffer selected from the group consisting of monopotassium phosphate, monoammonium phosphate, monosodium phosphate and monopotassium citrate, a trace amount of about 0.2% to about 0.7% by weight of an acid, selected from the group consisting of phosphoric acid, lactic acid, and citric acid, and combinations thereof;

about 2% to about 25% by weight of a liquid humectant, about 2% to about 25% by weight of a liquid selected from the group consisting of ethyl alcohol, isopropyl alcohol, n-propyl alcohol, an amine and combinations thereof;

about 2% to about 25% of liquid constituent Selected from the group consisting of ethylene glycol monobutyl ether, propylene glycol n-butyl ether, and combinations thereof;

about 0.2% to about 7.5% by weight of a non-soluble solid pulverant anhydrous aluminum silicate of preselected particle size within the range of about three to about five micrometers, for abrading and facilitating removal of surface contaminants on such press components, and the balance water selected from the group consisting of distilled water, deionized water, high-purity low-electrolyte water, and combinations thereof.

3. The solution of claim 2, in which no more than about 7.5% by weight is selected from the group consisting of ethyl alcohol, isopropyl alcohol, and n-propyl alcohol.

4. The solution of claim 2, in which an amine is selected from the group consisting of N-methyl pyrrolidone, trimethylamine and triethylamine.

5. The solution of claim 1 or 2, further including about 0.2% to about 5% by weight gum arabic.

6. The solution of claim 1 wherein the liquid humectant is selected from the group consisting of glycerin and propylene glycol, and in which the percentage by weight of the humectant selected is between about 10% and about 20% by weight.

7. A method for treatment of offset printing press components, as mounted in a printing press for a press run, including the printing plate and metal surfaces of the fountain solution system which can be exposed to printing ink, such treatment being carried out for purposes of extending desired printing quality, comprising the steps of:

selecting a cleansing and treatment solution as set forth in claims 1 or 2, or which is acceptable in relation to selections made for compatibility of the fountain solution, printing ink and blanket cylinder in use in such printing press run, temporarily interrupting printing operations on such printing press, wetting a pad means to act as a carrier for the selected solution, and wiping such printing press components with the pad means as wetted with such solution, while such components are mounted in such press and before restarting printing operations, so as to clarify printing image surfaces of such printing plate and desensitize water receptive and transfer surface portions of such press components which can be exposed to printing ink.

8. A method for cleansing and desensitizing water receptive portions of planographic printing plate and water transfer metal surfaces of the fountain solution system which can be exposed to ink during a press run, comprising the steps of:

selecting a treatment solution as set forth in claim 5 which is acceptable in relation to the selections made for compatibility of the printing ink and the fountain solution for the press run, interrupting printing operations of such printing press run, wetting a pad means to act as a carrier for such selected solution, and wiping such printing plate and metal surfaces of fountain solution system cylinders with such towel as impregnated with such solution while such plate and metal surfaces are mounted in such press and before restarting printing operations.

9. A method to provide for efficiently interrupting and restarting an offset printing press run, comprising:

interrupting printing operations of such press run, wetting a pad means with a selected treatment solution, as set forth in claim 5, which is acceptable based on the selections made for compatibility of the fountain solution and printing ink for the press run, wiping the printing plate with such solution-wetted pad means, and wiping metal surfaces of the fountain solution system which are subject to exposure to printing ink during printing operations with such solution-impregnated towel, such wiping action taking place without dismantling such press as such printing plate and metal surfaces are gradually moved for access purposes, and, thereafter, restarting printing operations of such press run free of any requirement for dismantling or for registry purposes of such printing plate before restarting printing operations subsequent to such interruption.

10. The method of claim 9, in which interruption of printing operations is extended between printing work shifts, further including wiping such printing plate with diluted fountain solution before resuming printing operations.

* * * * *